(12) United States Patent
Felemban et al.

(10) Patent No.: US 11,323,367 B2
(45) Date of Patent: May 3, 2022

(54) METHOD, APPARATUS AND SYSTEM FOR ENABLING COMMUNICATION USING MULTI-PROTOCOL GATEWAY AND VIRTUAL RESOURCE MANAGER

(71) Applicants: Emad Abdulrazzak Felemban, Makkah (SA); Adil Amjad Ashraf Sheikh, Makkah (SA); Moshin Murad, Makkah (SA); Muhammad Asif Manzoor, Makkah (SA)

(72) Inventors: Emad Abdulrazzak Felemban, Makkah (SA); Adil Amjad Ashraf Sheikh, Makkah (SA); Moshin Murad, Makkah (SA); Muhammad Asif Manzoor, Makkah (SA)

(73) Assignee: Umm-Al-Qura University, Makkah (SA)

( * ) Notice: Subject to any disclaimer, the term of this patent is extended or adjusted under 35 U.S.C. 154(b) by 668 days.

(21) Appl. No.: 14/596,162

(22) PCT Filed: Jun. 24, 2014

(86) PCT No.: PCT/IB2014/003258
§ 371 (c)(1),
(2) Date: Jan. 13, 2015

(87) PCT Pub. No.: WO2015/198087
PCT Pub. Date: Dec. 30, 2015

(65) Prior Publication Data
US 2017/0244635 A1 Aug. 24, 2017

(51) Int. Cl.
*H04L 45/745* (2022.01)
*H04L 45/52* (2022.01)
(Continued)

(52) U.S. Cl.
CPC ............ *H04L 45/745* (2013.01); *H04L 12/66* (2013.01); *H04L 45/52* (2013.01);
(Continued)

(58) Field of Classification Search
CPC ....... H04L 12/66; H04L 45/52; H04L 45/745; H04L 69/18; H04L 47/786; H04L 47/2491
See application file for complete search history.

(56) References Cited

U.S. PATENT DOCUMENTS 7,145,898 B1 * 12/2006 Elliott ................. H04L 29/1216
379/900
7,769,885 B1 * 8/2010 Kompella ........... H04L 43/0817
709/238

(Continued)

*Primary Examiner* — Melanie Jagannathan
(74) *Attorney, Agent, or Firm* — Geeta Kadambi; Riddhi IP LLC

(57) ABSTRACT

A method, apparatus and system for transferring data from an apparatus called multi-protocol gateway in a network seamlessly that operates using a particular protocol, to another device that is either in the same network or outside operating in a totally different protocol is described. Today, to accomplish this requires external units, one per technology. For example, for supporting both WiFi and WiMAX devices today, we would require a WiFi access point, a WiMAX base station and a router. We provide plug-ins that would handle multiple protocols within the same gateway, to cater to devices that operate in those protocols. The apparatus translates between various protocols in the back end making it inexpensive and portable. The unit is scalable, grows with technology, and acts as a gateway to a local network. The device can be configured to address Quality of Service, Priority between technologies and fault-tolerance through management layer.

10 Claims, 10 Drawing Sheets

(51) Int. Cl.
*H04L 12/66* (2006.01)
*H04L 69/18* (2022.01)
*H04L 47/2491* (2022.01)
*H04L 47/785* (2022.01)

(52) U.S. Cl.
CPC ........ *H04L 47/2491* (2013.01); *H04L 47/786* (2013.01); *H04L 69/18* (2013.01)

(56) References Cited

U.S. PATENT DOCUMENTS

| | | | |
|---|---|---|---|
| 7,990,993 B1* | 8/2011 | Ghosh | H04L 45/025 370/428 |
| 9,179,197 B2* | 11/2015 | Beckhardt | H04L 12/462 |
| 2008/0168523 A1* | 7/2008 | Ansari | H04W 12/0431 725/105 |
| 2009/0067441 A1* | 3/2009 | Ansari | H04L 12/2818 370/401 |
| 2011/0047581 A1* | 2/2011 | Caspi | H04L 65/1096 725/80 |
| 2013/0034039 A1* | 2/2013 | Wong | H04L 12/189 370/312 |
| 2014/0175875 A1* | 6/2014 | Newman, Jr | H04L 12/2818 307/18 |
| 2015/0347683 A1* | 12/2015 | Ansari | H04L 63/083 726/7 |
| 2019/0289648 A1* | 9/2019 | Kim | H04W 48/08 |

* cited by examiner

METHOD, APPARATUS AND SYSTEM FOR ENABLING COMMUNICATION USING MULTI-PROTOCOL GATEWAY AND VIRTUAL RESOURCE MANAGER

CROSS REFERENCE TO RELATED APPLICATIONS

The instant application is a utility application of the previously filed PCT Application PCT/US14/43854 filed on Jun. 24, 2014. The pending PCT application is hereby incorporated by reference in its entireties for all of its teachings.

FIELD OF TECHNOLOGY

The present invention relates to a method, apparatus and system for translating different wireless technologies allowing devices with different wireless standards to communicate with each other. The present invention also relates to a method that defines an access shared management unit as a system.

BACKGROUND

Wireless standards have evolved over time to cater to various applications. For example, Institute of Electrical and Electronics Engineers (IEEE) have been spearheading wireless standards for general purpose applications as part of it 802.11 and 802.16 standard bodies. They both use Direct Sequence Spread Spectrum (DSSS) technology to address Wireless Local Area Network (WLAN) and back haul requirements.

IEEE 802.11 standards predominantly address the license exempt frequencies such as 2.4 GHz and 5.8 GHz where most of the general purposes appliances such as smart phones, tablets, computers and media systems operate. IEEE 802.11 standards started with 802.11/b for 2.4 GHz based on Carrier Sense Multiple Access Collision Detection (CSMA/CD) concept to connect appliances, using what is popularly known as Wi-Fi protocol. Similarly IEEE 802.11/a standard for 5.8 GHz based on CSMA/CD connected appliances and backhaul long distance outdoor wireless points.

IEEE 802.11/a and IEEE 802.11/b standards evolved into 802.11/g, 802.11/n and now into 802.11/ac for addressing higher throughput using newer wireless antenna hardware technologies such as SISO and MIMO architectures. Importantly, IEEE has maintained a backward compatibility of IEEE 802.11 protocols within the frequency of operation as and when a new protocol standard is introduced. Therefore millions of appliances that use IEEE 802.11 based protocols can connect to each other and communicate.

IEEE 802.11 protocols do not provide predictable throughput due to CSMA/CD's limitation of back-off strategy when collision occurs. Therefore not all carrier and enterprise systems could use that protocol. To address predictable performance and higher security, IEEE started a new standard group, namely 802.16—popularly known as WiMAX. Initially IEEE 802.16/d standard addressed predictable performance for licensed frequencies where carriers in various countries applied to their government bodies to obtain license to operate in those frequency range.

IEEE 802.16/d addresses fixed access wireless connectivity to outdoor and indoor appliances for carrier and enterprise that have license to operate. The standard connected devices and guaranteed certain quality of service that can be configured. Similarly, IEEE 802.16/e protocol addressed mobile access wireless connectivity to outdoor and indoor appliances that are mobile. For example, connecting devices in taxis, buses and security vehicles to a base station using 802.16/e achieves predictable mobile connectivity using licensed frequencies.

Interestingly, appliances that operate using WiFi cannot interoperate with WiMAX, though all these protocols are a product of same standard body IEEE. This is also the case when WiFi protocol is operated on the same frequency as a WiMAX. The PHY and MAC layers of these protocols do not "talk" to each other.

There are several other wireless technologies other than DSSS. For example, Frequency Hopping Spread Spectrum (FHSS) changes carrier frequencies to communicate between appliances. For example, legacy radio technology such as Ultra High Frequency (UHF), 900 MHz and Open Air 2.4 GHz use FHSS technology. It is important to note FHSS based appliances do not interoperate with any of the appliances that use DSSS based technology. IEEE 802.15 standard based on FHSS technology deals with Wireless Personal Access Network (WPAN), popularly known as Bluetooth to connect appliances that are within short distance.

Similarly Radio Frequency ID (RFID), Zigbee and Z-Wave use technology using very low frequency to communicate with appliances that are within short distances. Wireless network appliances today operate using various technologies that include WiFi, WiMAX, RFID, and Bluetooth. However, none of these technologies interoperate. A WiFi access Point (AP) cannot communicate with a WiMAX Access Client (AC) even if they work in the same frequency and same DSSS technology. Similarly, a RFID tag cannot be excited using a WiFi access point, and a Bluetooth appliance cannot communicate through WiFi AP.

Such lack of interoperability has led to frustration among many users who invest time and resources on various technology adding devices and appliances without knowing how to communicate between them. There is a need for introducing a system that enables interoperability.

In addition, to interconnect various technologies, an additional router is warranted which costs extra resources for users. There are additional expenses to manage other devices such as Cameras, Printers, Monitors and hard drives.

SUMMARY

In the present disclosure, we propose a method that enables communication of data between various appliances that use different technology and IEEE standards and other technology using a multi-protocol gateway. In another embodiment, a system for the multi-protocol gateway is used which acts as a translator between different wireless technologies allowing devices with different wireless standards to communicate with each other. In another embodiment, an apparatus to plug in any system to multi-protocol gateway apparatus for connectivity and output.

In one embodiment, once the multi-protocol gateway is installed, it replaces a router that normally interconnects everything using Ethernet. In one embodiment, the gateway is used as a virtual resource managing device that manages the gateway access through shared resource management interfaces. The gateway has Ethernet, Serial and USB interfaces through which other devices such as Camera, Printer, Monitors and external hard drives can be connected.

The proposed gateway will have wireless interfaces to connect to access client appliances belonging to various technologies in addition to wired interfaces such as USB, Serial and Ethernet interfaces. A method, in one embodiment, comprises of receiving data from a device belonging to one protocol or resource and send to another device operating in another protocol or resource seamlessly within the networking domain; monitoring and configuring a disputed package for a destination address; resolving the destination address at a routing table; and transferring data from the device belonging to one protocol or a resource connectivity to another that is connected externally through an Internet.

In one embodiment, a system comprises of an interface module to receive a technology connection; a forwarding interface to have a plug-in for several protocols for demarshalling, translating and forwarding to an appropriate port; a routing module to resolve the issues of an outgoing interface issue; and a management module to manage configuration and monitor an apparatus. The technology connection is at least one of a Zigbee, Bluetooth, RFID, WiFi, WiMAX, Ethernet, USB, cameras, printers, serial port, computer, lap top, mobile device, scanner and cell phone.

The methods, apparatus and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and no limitation in the graph and in the accompanying figures, like references indicate similar elements and in which.

Other features of the present embodiments will be apparent from the accompanying detailed description that follows.

DETAILED DESCRIPTION

The present disclosure relates to a method, apparatus and system to connect disparate and various devices having different protocols and provide one seamless method, system and apparatus for communication between different devices.

Figure 1:
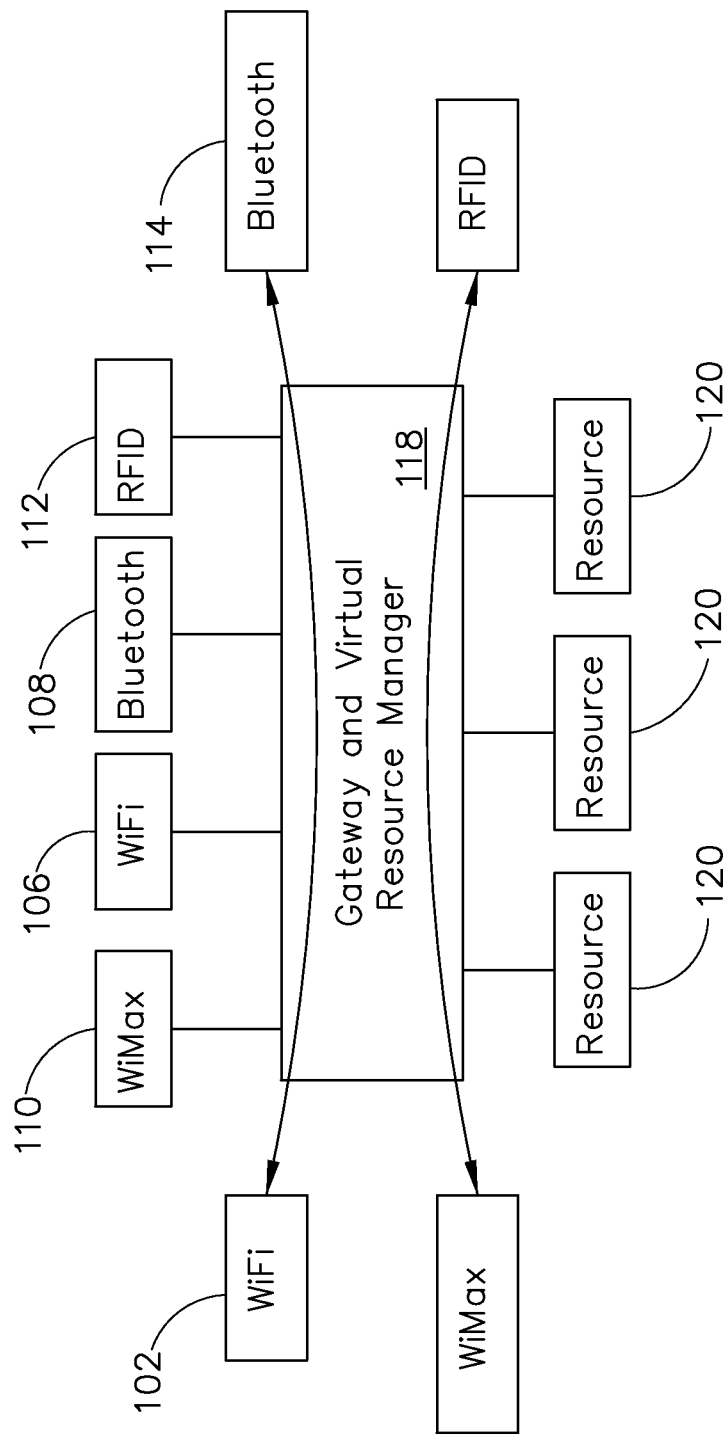
FIG. 1 is a diagram illustrating the high level architecture of the multi-protocol gateway, illustrated here as Wireless Gateway 118. The wireless gateway acts as a translator between appliances that use different protocols.

FIG. 1 is a diagram illustrating the high level architecture of the multi-protocol gateway, illustrated here as Wireless Gateway 118. The wireless gateway acts as a translator between appliances that use different protocols. For example, Wireless Gateway 118 could support WiFi 106 protocol, WiMAX 110 protocol, Bluetooth 108 and RFID 112. When a WiFi appliance 102 wants to communicate with an appliance that operates using Bluetooth 114, the Wireless Gateway 118 acts as a translator between them. Similarly when a WiMAX appliance needs to communicate to RFID tag 116, the Wireless Gateway 118 acts as a translator. In addition, the Gateway also manages the local common resources through Virtual Resource Manager 118 component. The manager 118 handles various resources 120 such as locally connected Cameras, Printers and Scanners allowing, for example, a WiFi appliance 102 to print directly to a resource 120 or scan using a resource or take a picture.

Figure 2:
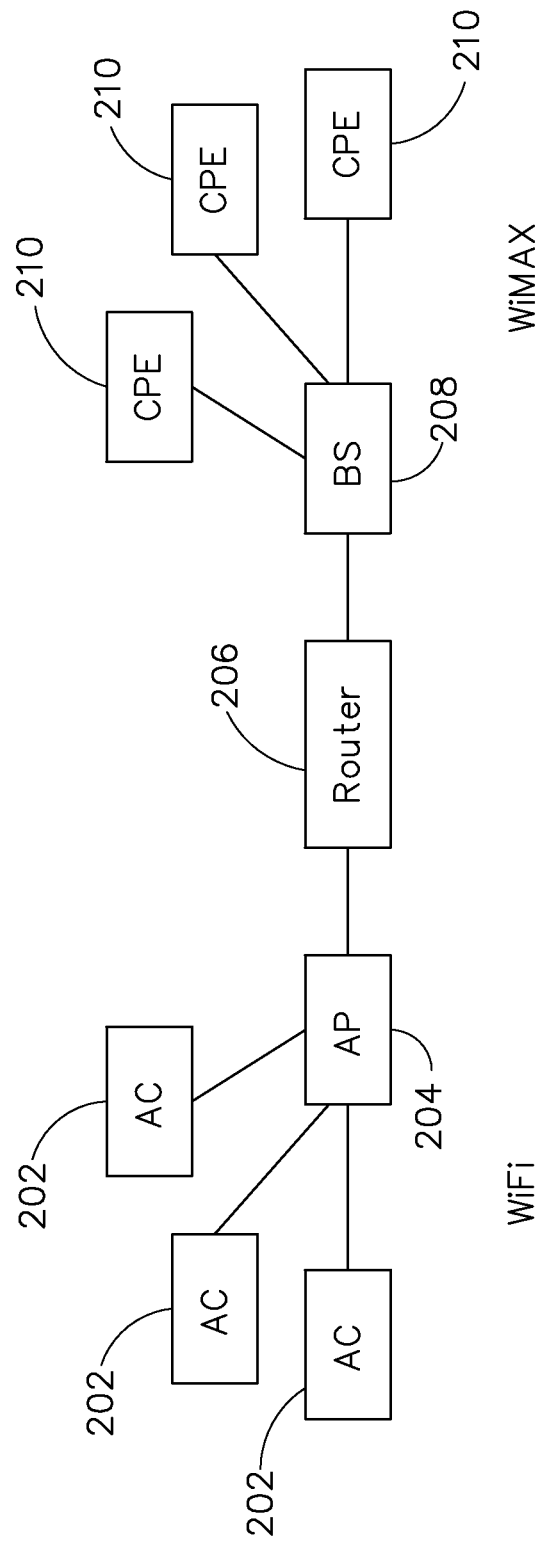
FIG. 2 depicts the present constraints that users face today when they use appliances that work using multiple technologies. For example, let us say a device connected to a WiFi Access Client (AC) wants to communicate to another device connected to a WiMAX Customer Premises Equipment (CPE), and then a standard router that is available today in the market cannot do it.

FIG. 2 shows the present constraints that occur in terms of connectivity today. For example, if a device such as a laptop connected an Access Client (AC) 202 that runs using WiFi protocol wants to communicate to a device that is connected to a Customer Premises Equipment (CPE) 210, a router 206 is necessary in between. The connectivity is also not possible directly when a router is connected as all the devices need to be in the same network domain and address space. The connectivity can happen only at the application level. It is even more difficult when devices want to either communicate to other devices through different protocols, or to an appliance.

Figure 3:
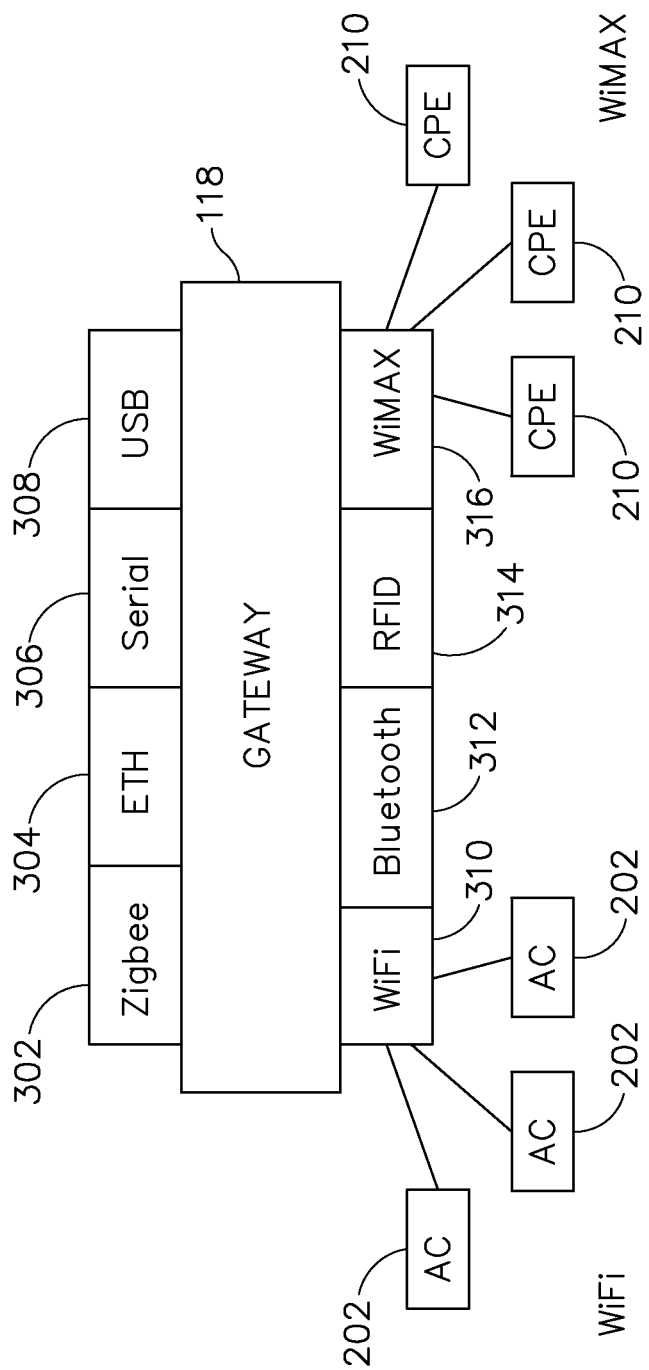
FIG. 3 provides a high level architecture of the Multi-protocol Gateway. The Gateway 118 has interfaces connecting to modules supporting various protocols both wired and wireless

FIG. 3 shows the proposed Multi-Protocol Gateway 118 Architecture where devices connected to various protocols can interconnect and communicate between each other without requiring expensive gadgets in between. The Gateway offers the link level translation between various protocols, both wired and wireless. For example, a device connected through WiFi AC 202 can print using a printer connected through a serial port 306, and communicate to another device connected over Zigbee 302. The translation happens between multiple protocols and hence the frustration of incompatibility is reduced. The system and method accommodates both a wired and a wireless protocol, and the resource connectivity such as an USB, Ethernet and Serial port.

Figure 4:
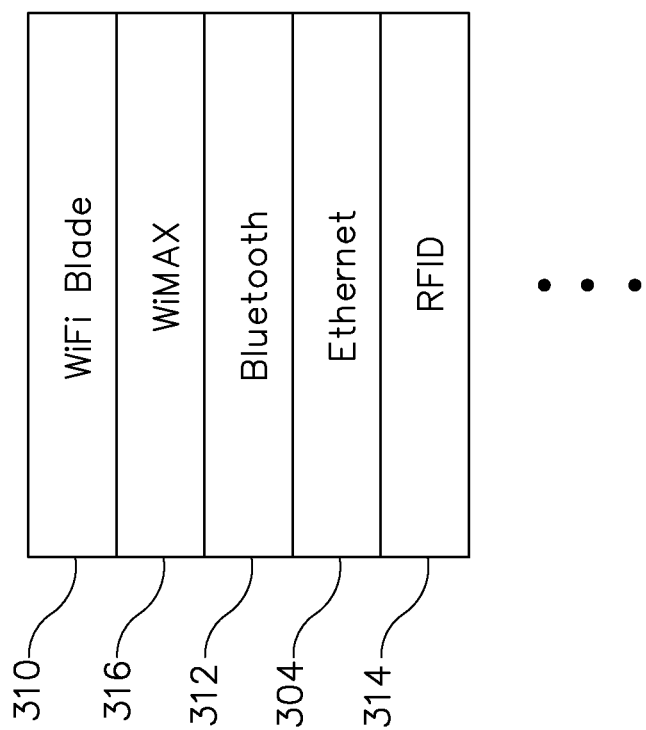
FIG. 4 shows the scalability of the Wireless Gateway 118 architecture, where the interfaces are plug-and-play. Various protocol modules can be added to make the Gateway support Multi-protocol compatible as and when the protocols are introduced.

FIG. 4 shows that a Multi-Protocol Gateway 118 can be implemented in such a way that new protocol modules can be plugged. For example, a WiFi blade 310, a WiMAX 316, a Bluetooth 312, an Ethernet 304 or a RFID 314 can be added as and when available, or removed when obsolete. This makes the Gateway 118 very scalable and amenable to various protocols that are used continuously.

Figure 5:
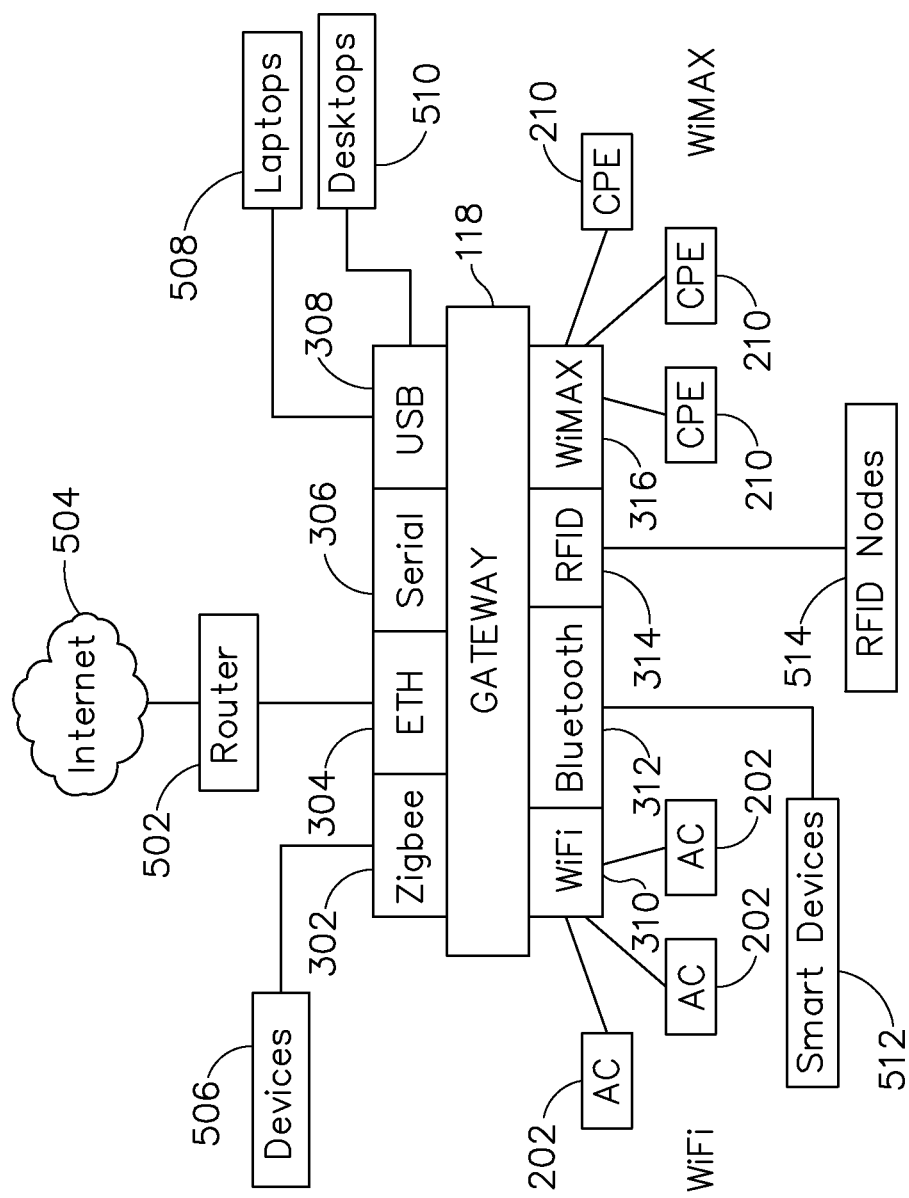
FIG. 5 shows the end-to-end architecture where devices that operate in a certain protocol can seamlessly connect and communicate to another device connected to a different protocol or to a device that is remotely resident connected over the Internet.

FIG. 5 shows the big picture where the Gateway 118 is connected to an external world (Internet 504) using a Router 502. Internally, the Gateway 118 manages devices belonging to various protocols and technologies such as Zigbee 302, Ethernet 304, Serial port 306, USB 308, WiFi 310, Bluetooth 312, RFID 314 and WiMAX 316. This would allow an enterprise to manage dissimilar clients to interoperate between each other and communicate internally. Externally, the Gateway can connect to a router and access the Internet. Also, devices within a network such as laptops 508 and desktops 510 can be connected through any of the devices connected via any supported protocol without worries of translation or interoperability.

Figure 6:
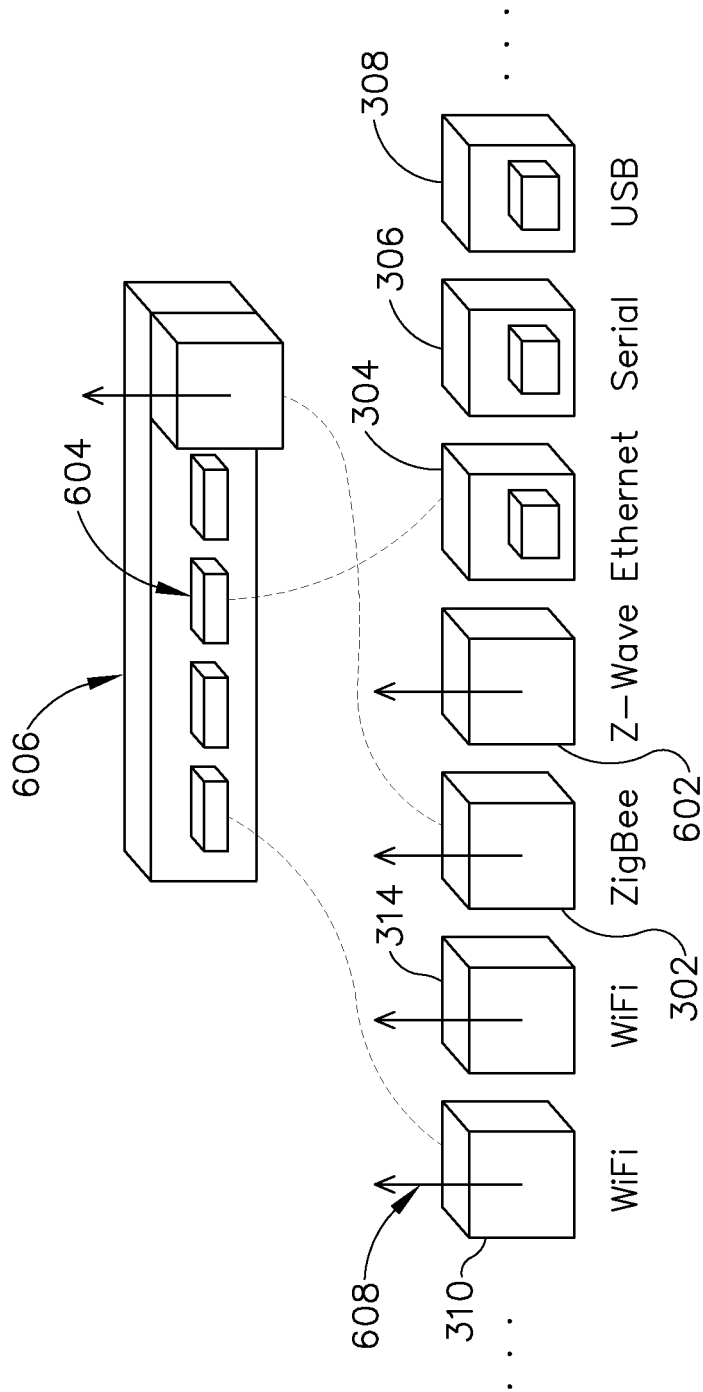
FIG. 6 shows the interoperability of various modules within the Wireless Gateway 118, where the main unit has the cross connect to communicate between modules, and various protocols are modularized to plug and play.

FIG. 6 shows the interoperability of Gateway 118 between various protocols. The core main unit 606 has the basic software that does forwarding packets and translation of protocols based on the destination. The main unit 606 also has interfaces for various I/O modules and their respective protocols, both wired and wireless. The wireless protocols such as WiFi 310, RFID 314, ZigBee 302 and Z-Wave 602 are supported by respective antennas 608 as the plug-in modules act as respective access points. The access clients communicate with the access points connected to the main unit. The edge devices (such as laptops with WiFi) communicate via WiFi access points 310 and reach the end-point either internal or external.

FIG. 6 shows a block diagram of the main unit with wired and wireless modules. The modular wireless gateway device 118 consists of 1) a main unit that contains a High end processing unit, large memory and fast I/O interface, 2) wired and wireless modules that can be inserted into the main device to enable that main device to interact using the same wireless technology and 3) wired interface modules such as Ethernet, Serial and USB interfaces that could be used to connect shared resources.

Figure 7:
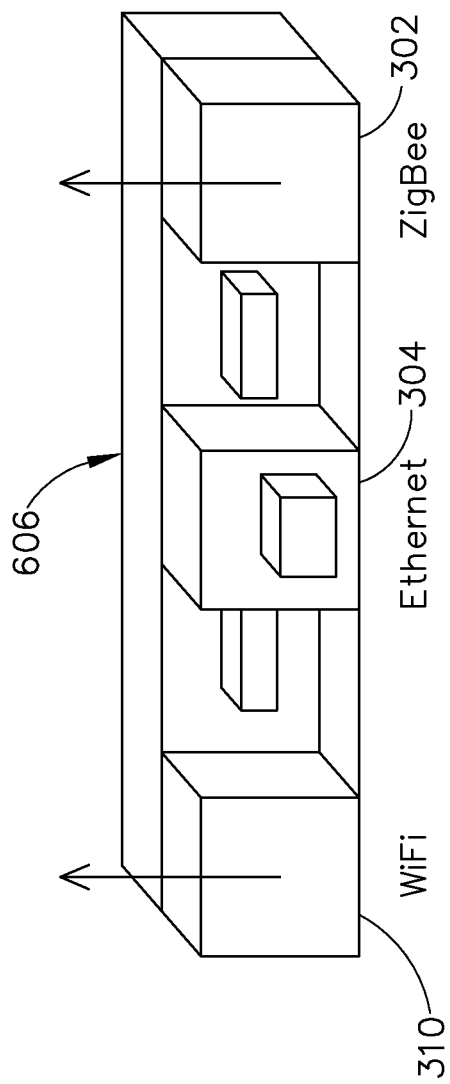
FIG. 7 shows the Wireless Gateway 118 physical ports, where the modules are connected to the gateway through standard backplane architecture.

FIG. 7 shows the close in picture of how the physical ports look like. The main unit 606 has plug-in modules supporting various protocols. For example, WiFi AP 310 with antenna is plugged into the main unit 606. An Ethernet port 304 module is connected to the main unit 606 to support devices that can connect through Ethernet 304. The Cat5 cable is connected between the end device and the Ethernet 304 module. Similarly, Zigbee module with antenna 302 is plugged into the main module 606 to support all Zigbee clients. It is evident in the picture that there are vacant spots, such as one between 310 and 304, and one between 304 and 302, where modules supporting other protocols can be connected in future.

Figure 8:
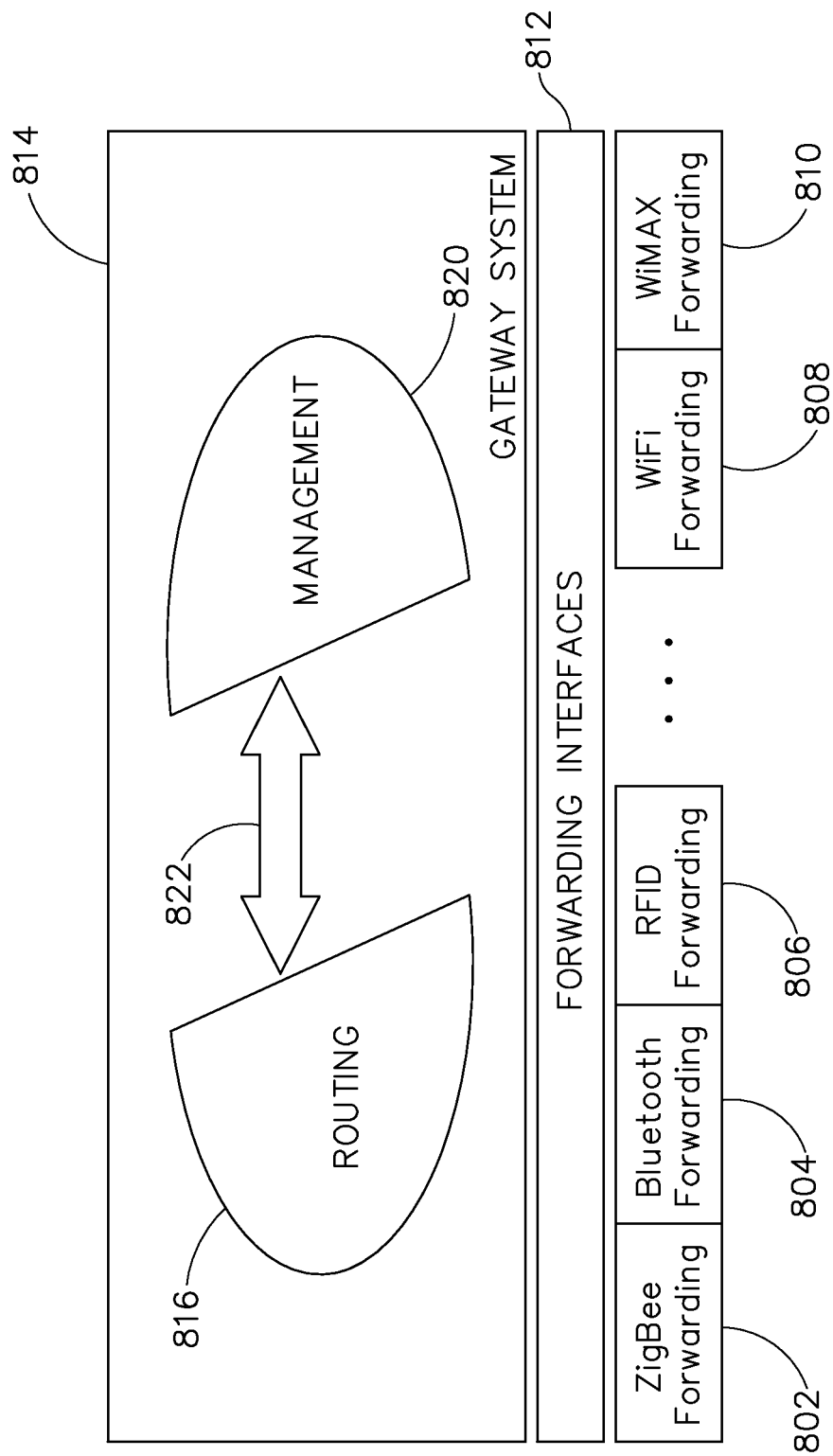
FIG. 8 depicts the backplane design, where the physical layer connectivity exists to various protocols. They are in turn connected via forwarding interfaces to Layer 3 and management layers.

FIG. 8 shows the backplane design of the main module 606. The design shows various levels. The top level, namely the Gateway system 814 consists of Routing 816 and Management 820 layers. The communication between the two layers is through messaging 822. The Gateway system is connected to various technologies using forwarding interfaces 812. Forwarding interfaces 812 have plug-ins for every supported protocol. For example, if Zigbee is supported, then Zigbee forwarding 802 modules plug-in exists. The plug-ins are very important, as the packets sent by the Zigbee 802 client needs be de-marshalled, translated and forwarded to proper outgoing ports through other forwarding plug-ins. Similarly, Bluetooth 804, RFID 806, WiFi 808 and WiMAX 810 plug-ins exist. If a WiFi client communicates to WiFi AP, the packets are received by the WiFi forwarding 808, and sent to the Forwarding interfaces 812. The forwarding module checks for the outgoing address and forwards to the proper forwarding port so that the packet goes "out". The Routing module 816 periodically sends control messages and determines the outgoing port and updates the forwarding table. The Virtual Resource Manager, namely management 820 modules is used for configuration and monitoring of the Gateway. When the management module 820 is accessed and the Gateway configured for operation, the configuration is conveyed through messages 822 to the routing 816 system. The Virtual Resource Manager is used to force a forwarding interface for a packet coming from a particular port, or to configure Quality of Service and priorities or to collect performance data.

Virtual Resource Manager 820 handles the complete management of the Multi-protocol Gateway. The manager has two functions:

The first function is to manage the Gateway by configuring and monitoring. Various protocols supported by the Gateway are configured for smooth functioning by the management entity. For example, Quality of Service (QoS), Priority between various technologies, Fault-tolerance and Selection of outgoing interface based on service provider are handled by the management entity.

The second function is to manage the common resources that are attached to the gateway. For example—Cameras, Printers, Scanners, Copiers, Storage devices, Media servers, etc are common resources for all the devices operating through the Gateway that belong to various technologies. Resource manager allows a laptop with a WiFi radio card can use the same printer as a smart phone connected over a Bluetooth.

Figure 9:
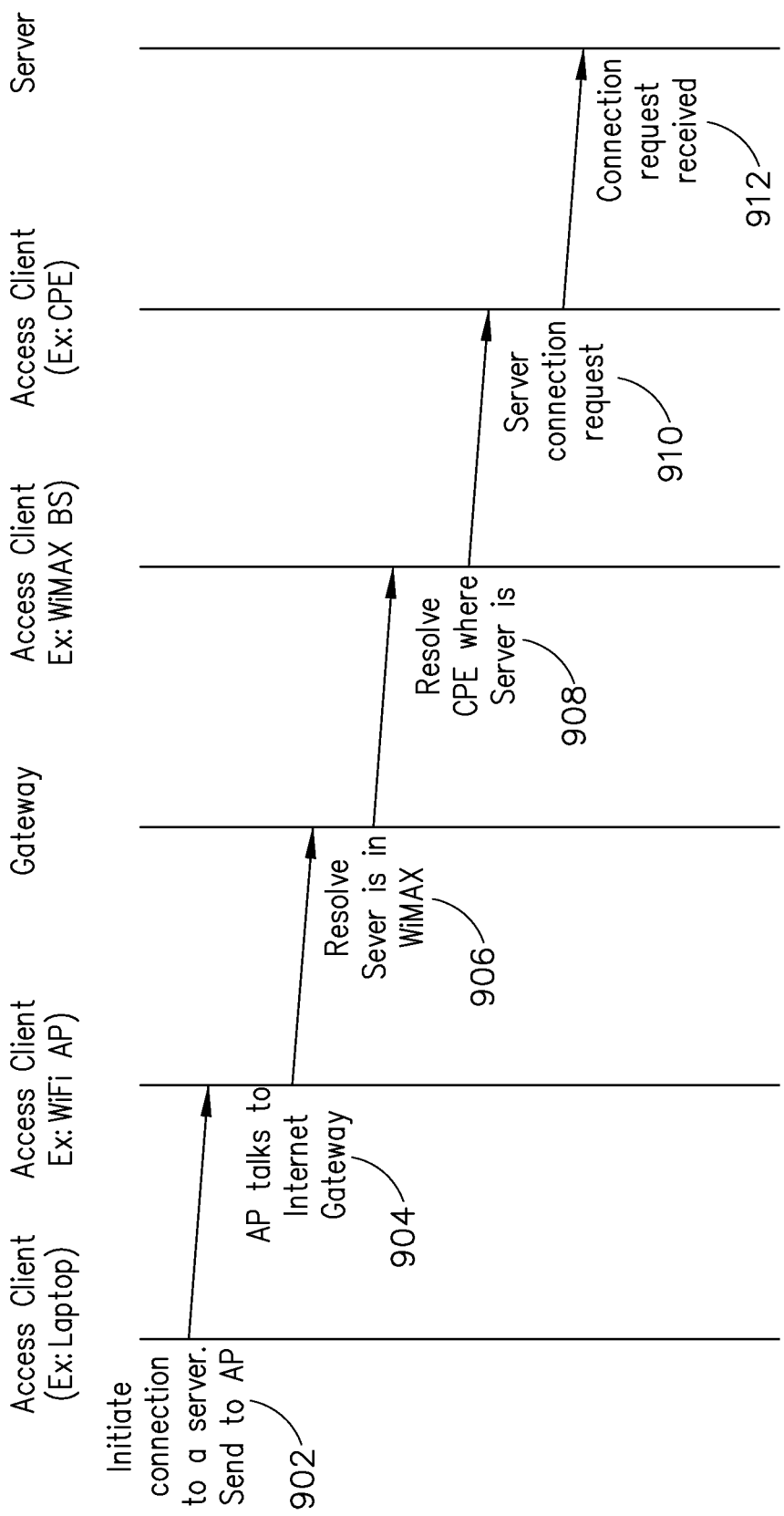
FIG. 9 shows a use case for a connection request between a device connected to an Access Point to a Server. The message sequence chart shows the function flow across the gateway to reach the server.

FIG. 9 shows the use case for a connection request from a device such as laptop connected over a WiFi network to connect to a Server in WiMAX network. When a laptop wants to connect to a server, it will first initiate connection to a server using its application (example: browser). The request in form of a packet is sent through the WiFi card in the laptop to the WiFi access point 902. When the WiFi AP receives the packet 904, WiFi forwarding module 808 forwards the packet up the layer to Forwarding Interfaces 812. Now a decision needs to be made how to send this packet so that it reaches the destination address of server. The forwarding layer uses the forwarding table that is periodically updated by the routing 816 module, to find the outgoing interface. The table consists of <incoming, outgoing> interface pairing for destination address group. The Gateway resolves and in this use case determines that the outgoing interface is to an internal WiMAX network 906. The packet is sent to the WiMAX forwarding module 810—the Base Station. The Base Station resolves the CPE to which the server belongs 908. The CPE receives the request to connect to a server 910. The Server is sent the request 912 by the CPE.

Communication to any other internal modules is similar to the use case described in FIG. 9. If in the example provided in FIG. 9, the Server had been outside the Gateway, the Forwarding Interfaces 812 would have resolved the request as an external address and forwarded it to a port that has connectivity to the Internet 504 through a Router 502.

Figure 10:
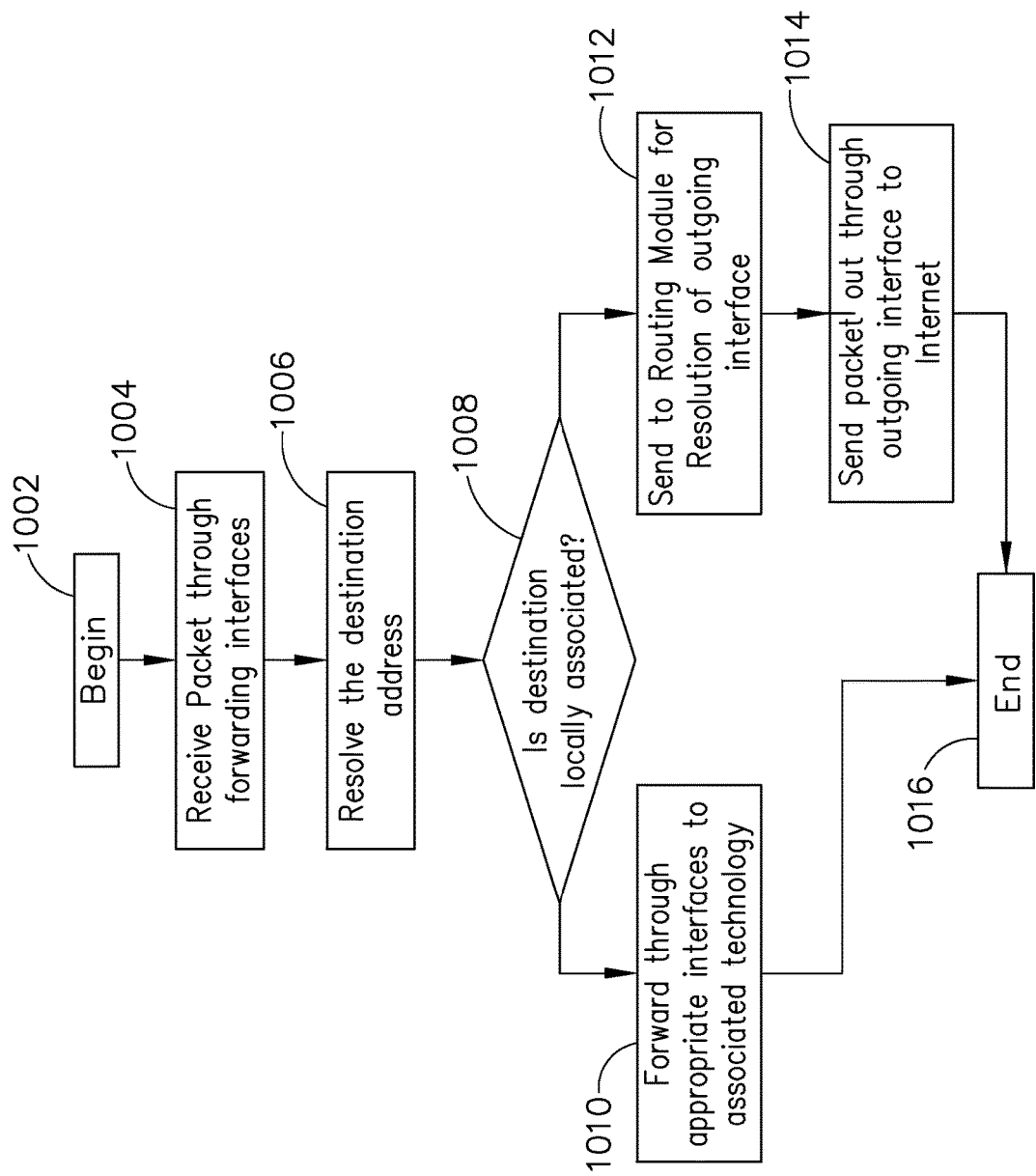
FIG. 10 shows the Wireless Gateway 118 Forwarding layer. The flow chart captures the control and data flow across the forwarding layer.

FIG. 10 describes the Gateway Forwarding Layer 1002. The packet is received by the forwarding interfaces through one of the ports (forwarding module—example, WiFi, Zigbee, WiMAX, Ethernet USB, RFID, etc) belonging to a particular protocol module 1004. The destination address is resolved from the packet header 1006. The forwarding intelligence checks if the destination is locally associated 1008, and if it is then the forwarding table provides the appropriate outgoing interface module through which the packet can be sent 1010. For example, in FIG. 9, the packet was sent through a local WiMAX interface. If the destination is not locally associated, the routing module resolves the outgoing interface 1012 as it has to be sent through a proper external port. Most often, the routing module periodically updates the forwarding table to include this scenario so any non-local destinations can be resolved to default outgoing ports. Regardless of the method, the packet that needs to be sent through external ports are sent after resolution 1014 to the router that handles Internet.

Multi-protocol Gateway 118 makes it easy and inexpensive to handle the support of various technologies using a simple translation box. The gateway is made plug-and-play so when a new technology is introduced, a module that supports that technology is added to the gateway. If a particular technology is obsolete, that module is removed. The removal can be logical as well, when done through the management layer 820. The technology connection or resource connectivity is at least one of a Zigbee, Bluetooth, RFID, WiFi, WiMAX, Ethernet, USB, cameras, printers, serial port, computer, lap top, mobile device, scanner and cell phone.

INDUSTRIAL APPLICABILITY

Accordingly, the specification and drawings are to be regarded in an illustrative rather than a restrictive sense. The invention is valid for general home or enterprise network that works with various well known standards. The invention works with standards associated with both wired and wireless networks. The invention does not require any special modifications to the main module when a new protocol is added. The hallmark of the invention is that it works seamlessly with multiple wired and wireless protocols by plug-and-play module. The APIs for interfacing with a new technology is well-defined, and the forwarding module to support a new technology uses that API to plug seamlessly with the forwarding interfaces. The routing and management layers need not be changed that much at all. The invention is directly applicable to networking industry to support devices that need to interoperate with various other devices either within a single networking addressing domain or with devices that are connected externally. This also alleviates in investing in expensive units for every individual protocol that needs to be supported.

What is claimed is:

1. A method enabling communication of data between various appliances, comprising:
receiving a data from a device belonging to one protocol or resource;
managing virtual resource device that manages the gateway access through shared resource management interfaces;
translating between different a data from a device belonging to one protocol or resource and allowing devices with different wireless standards to communicate with each other and send to another device operating in another protocol or resource seamlessly within the networking domain;
monitoring and configuring a disputed package for a destination address;
resolving the destination address at a routing table; and
transferring data from the device belonging to one protocol or a resource connectivity to another that is connected externally through an Internet.

2. The method of claim 1, wherein the one protocol and the resource connectivity are at least one of a Zigbee, Bluetooth, RFID, WiFi, WiMAX, Ethernet, USB, cameras, printers, serial port, computer, lap top, mobile device, scanner and cell phone.

3. The method of claim 1, wherein the another protocol and the resource connectivity are at least one of a Zigbee, Bluetooth, RFID, WiFi, WiMAX, Ethernet, USB, cameras, printers, serial port, computer, lap top, mobile device, scanner and cell phone.

4. The method of claim 1, further comprising:
supporting a multiple wired and wireless protocol in a plug-and-play model so that the device can communicate seamlessly.

5. The method of claim 4, further comprising:
adding a new protocol and removing an old protocol that are not used so that the device can communicate without any hindrance to the introduction or obsolescence of technology.

6. The method of claim 4, further comprising:
supporting forwarding in a routing layer where intelligence such as a quality of Service, a priority and a Fault-tolerance can be introduced through configuration by a management layer.

7. The method of claim 4, further comprising:
accommodating both a wired and a wireless protocol, and the resource connectivity such as an USB, Ethernet and Serial port.

8. A wireless gateway system, comprising:
an interface module to receive a technology connection from several devices connected to various protocols can interconnect and communicate between each other;
a wireless gateway device provides the link level translation between various protocols, both wired and wireless;
a forwarding interface to have a plug-in for several protocols for demarshalling, translating and forwarding to an appropriate port;
a routing module to resolve the issues of an outgoing interface issue; and
a management module to manage configuration and monitor an apparatus.

9. The system of claim 8, wherein the technology connection is at least one of a Zigbee, Bluetooth, RFID, WiFi, WiMAX, Ethernet, USB, cameras, printers, serial port, computer, lap top, mobile device, scanner and cell phone.

10. The system of claim 8, wherein the apparatus is a multi-protocol gateway.

* * * * *